US006463813B1

(12) United States Patent
Gysling

(10) Patent No.: US 6,463,813 B1
(45) Date of Patent: Oct. 15, 2002

(54) DISPLACEMENT BASED PRESSURE SENSOR MEASURING UNSTEADY PRESSURE IN A PIPE

(75) Inventor: Daniel L. Gysling, Glastonbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/344,069

(22) Filed: Jun. 25, 1999

(51) Int. Cl.[7] ................................................. G01L 1/10
(52) U.S. Cl. ....................... 73/862.59; 73/592; 73/579
(58) Field of Search ..................... 73/861.385, 861.357, 73/198, 861.18, 702, 703, 592, 579, 862.59, 40.5 A, 649, 432.1, DIG. 1

(56) References Cited

U.S. PATENT DOCUMENTS

| 3,149,492 A | 9/1964 | Weinberg | |
|---|---|---|---|
| 3,844,173 A | 10/1974 | Rockstead et al. | ............. 73/398 |

(List continued on next page.)

FOREIGN PATENT DOCUMENTS

| DE | 19511234 | 12/1995 | |
|---|---|---|---|
| EP | 0684458 | 5/1995 | |
| FR | 2 357 868 | 7/1976 | |
| JP | 406082281 | 9/1992 | |
| WO | WO 93/14382 | 7/1993 | |
| WO | WO 96/04528 | 2/1996 | |
| WO | WO 00/00793 | 1/2000 | |
| WO | WO 01/02810 | 1/2001 | ............. G01F/1/74 |

OTHER PUBLICATIONS

PCT International Search Report for corresponding International Application (dated Jun. 14, 2002).
Mesch, F. (1990) "Speed and Flow Measurement by an Intelligent Correlation System", Advances in Instrumentation and Control, Research Triangle Park, NC, part 4, p.1899–1914.

(List continued on next page.)

Primary Examiner— Benjamin R. Fuller
Assistant Examiner—Jewel V. Thompson
(74) Attorney, Agent, or Firm—Howrey Simon Arnold & White, LLP

(57) ABSTRACT

A non-intrusive pressure sensor and method for measuring pressures within a pipe includes a displacement based sensor disposed on a surface of the pipe. The displacement based sensor measures the radial displacement response of the surface of the pipe to the unsteady pressure. The displacement based sensor may comprise an accelerometer, an absolute velocity sensor, or an absolute displacement sensor. One or more of sensors may be axially distributed along the pipe or alternatively the sensors may be circumferentially distributed about the pipe.

18 Claims, 2 Drawing Sheets

U.S. PATENT DOCUMENTS

| | | |
|---|---|---|
| 3,851,521 A | 12/1974 | Ottenstein |
| 4,080,837 A | 3/1978 | Alexander |
| 4,114,439 A | 9/1978 | Fick |
| 4,144,768 A | 3/1979 | Andersson |
| 4,159,646 A | 7/1979 | Paulsen |
| 4,164,865 A | 8/1979 | Hall |
| 4,236,406 A | 12/1980 | Reed |
| 4,275,602 A | 6/1981 | Fujishiro |
| 4,445,389 A | 5/1984 | Potzick |
| 4,499,418 A | 2/1985 | Helms |
| 4,515,473 A | 5/1985 | Mermelstein |
| 4,520,320 A | 5/1985 | Potzick |
| 4,546,649 A | 10/1985 | Kantor |
| 4,706,501 A | 11/1987 | Atkinson |
| 4,788,852 A | 12/1988 | Martin |
| 4,813,270 A | 3/1989 | Baillie |
| 4,862,750 A | 9/1989 | Nice |
| 4,864,868 A | 9/1989 | Khalifa |
| 4,884,457 A | 12/1989 | Hatton |
| 4,896,540 A | 1/1990 | Shakkottai |
| 4,932,262 A | 6/1990 | Wlodarczyk |
| 4,947,127 A | 8/1990 | Helms |
| 4,950,883 A | 8/1990 | Glenn |
| 4,976,151 A | 12/1990 | Morishita |
| 4,996,419 A | 2/1991 | Morey |
| 5,024,099 A | 6/1991 | Lee |
| 5,031,460 A | 7/1991 | Kanekobu |
| 5,040,415 A | 8/1991 | Barkhoudarian |
| 5,051,922 A | 9/1991 | Toral |
| 5,058,437 A | 10/1991 | Chaumont |
| 5,083,452 A | 1/1992 | Hope |
| 5,099,697 A | 3/1992 | Agar |
| 5,115,670 A | 5/1992 | Shen |
| 5,152,181 A | 10/1992 | Lew |
| 5,207,107 A | 5/1993 | Wolf |
| 5,218,197 A | 6/1993 | Carroll |
| 5,317,576 A | 5/1994 | Leonberger |
| 5,321,991 A * | 6/1994 | Kalotay .................. 73/861.37 |
| 5,347,873 A | 9/1994 | Vander Heyden |
| 5,361,130 A | 11/1994 | Kersey |
| 5,363,342 A | 11/1994 | Layton |
| 5,367,911 A | 11/1994 | Jewell |
| 5,372,046 A | 12/1994 | Kleven |
| 5,398,542 A | 3/1995 | Vasbinder |
| 5,401,956 A | 3/1995 | Dunphy |
| 5,426,297 A | 6/1995 | Dunphy |
| 5,440,932 A | 8/1995 | Wareham |
| 5,493,390 A | 2/1996 | Varasi |
| 5,493,512 A | 2/1996 | Peube |
| 5,513,913 A | 5/1996 | Ball |
| 5,564,832 A | 10/1996 | Ball |
| 5,576,497 A | 11/1996 | Vignos |
| 5,591,922 A | 1/1997 | Segeral |
| 5,597,961 A | 1/1997 | Marrelli |
| 5,639,667 A | 6/1997 | Heslot |
| 5,642,098 A | 6/1997 | Santa |
| 5,644,093 A * | 7/1997 | Wright et al. .............. 73/866.5 |
| 5,654,551 A | 8/1997 | Watt |
| 5,670,720 A | 9/1997 | Clark |
| 5,680,489 A | 10/1997 | Kersey |
| 5,689,540 A | 11/1997 | Stephenson |
| 5,708,211 A | 1/1998 | Jepson |
| 5,730,219 A | 3/1998 | Tubel |
| 5,732,776 A | 3/1998 | Tubel |
| 5,741,980 A | 4/1998 | Hill |
| 5,803,167 A | 9/1998 | Bussear |
| 5,804,713 A | 9/1998 | Kluth |
| 5,842,347 A | 12/1998 | Kinder |
| 5,845,033 A | 12/1998 | Berthold |
| 5,906,238 A | 5/1999 | Carmody |
| 5,907,104 A * | 5/1999 | Cage et al. ............ 73/861.355 |
| 5,908,990 A | 6/1999 | Cummings |
| 5,925,821 A | 7/1999 | Bousquet |
| 5,925,879 A | 7/1999 | Hay |
| 5,939,643 A | 8/1999 | Oertel |
| 5,956,132 A | 9/1999 | Donzier |
| 5,959,547 A | 9/1999 | Tubel |
| 5,963,880 A | 10/1999 | Smith |
| 5,975,204 A | 11/1999 | Tubel |
| 5,992,519 A | 11/1999 | Ramakrishnan |
| 5,996,690 A | 12/1999 | Shaw |
| 6,002,985 A | 12/1999 | Stephenson |
| 6,003,383 A | 12/1999 | Zielinska |
| 6,003,385 A | 12/1999 | De Vanssay |
| 6,009,216 A | 12/1999 | Pruett |
| 6,016,702 A | 1/2000 | Maron |
| 6,158,288 A | 12/2000 | Smith |
| 6,216,532 B1 | 4/2001 | Stephenson |
| 6,233,374 B1 | 5/2001 | Ogle |
| 6,279,660 B1 | 8/2001 | Hay |
| 6,354,147 B1 | 3/2002 | Gysling |

OTHER PUBLICATIONS

Gysling, D. (1999) "Development of a Fiber Optic Downhole Multiphase Flow Meter", in "Field Applications & New Technologies for Multiphase Metering", Multiphase Technology Series Conference, Aberdeen, Scotland.

Beranek, L. and Ver, I. (1992) in "Noise and Vibration Control Engineering, Principles and Application", John Wiley & Sons, Inc., Chapter 14, p:537–541.

Dowling, A. and Williams, J. in "Sound and Sources of Sound", Ellis Horwood Limited, Section 4, p:79–80.

Kersey, A. et al. (1993) "Multiplexed Fiber Grating Strain-Sensor System with a Fiber Blagg Fabry–Perot Wavelength Filter", Optics Letters, 18:1370–1372.

Dandridge, A. & Cogdell, G. (1991) "Fiber Optic Sensors for Navy Applications", IEEE, LCS, 2:81–89.

Nielsen, R. (1991) "Sonar Signal Processing", Artech Huse Inc., Chapter 2, p:51–59.

Krim A. and Viberg M. (1996) "Two Decades of Array Signal Processing Research", IEEE Signal Processing Magazine, p:67–94.

Kersey A. and Darkin, J., Editors (1992) SPIE vol. 1586, "Distributed and Multiplexed Fiber Optic Sensors", p:1–243.

Nerby et al. "A cost effective technique for production well testing", (1995) Offshore Technology Conference, p:505–515.

"Noise and Vibration Control Engineering Principles and Applications", Leo L. Beranek and Istvan L. Ver, A Wiley Interscience Publication, pp. 537–541.

"Mandrel–Wound Fiber Optic Pressure Sensor", P. Ogle, D. Gysling and A. Kersey, Docket CC–0033, pp. 1–22.

CiDRA Presentation on "Flow Meter", Dec. 7–18, 1998, Houston, TX.

"Sound and Sources of Sound", by A. P. Dowling and J. E. Williams, pp. 224–229.

* cited by examiner

DISPLACEMENT BASED PRESSURE SENSOR MEASURING UNSTEADY PRESSURE IN A PIPE

TECHNICAL FIELD

This invention relates to sensing pressure in pipes, and more particularly to a non-intrusive displacement based pressure sensor for measuring pressures of a medium within pipes.

BACKGROUND ART

It is known in the oil and gas industry that the measurement of fluid pressure in a down-hole pipe is useful to exploration and production of oil and gas. However, typical pressure sensors require that a hole be drilled in the pipe to port the pressure to the sensor, or that the sensor or portion thereof be deployed in the pipe. Drilling holes in the pipes can be costly and add failure modes to the system. Accordingly, it would be desirable to measure pressure in a pipe in a non-invasive manner.

SUMMARY OF THE INVENTION

Objects of the present invention include provision of a non-intrusive pressure sensor for measuring unsteady pressure in pipes.

According to the present invention, a pressure sensor for measuring unsteady pressure in at least one axial location along a pipe comprises a displacement based sensor disposed on a surface of the pipe.

According still further to the present invention, the surface of the pipe provides a radial displacement response to the unsteady pressures within the pipe and the displacement-based sensors measure the magnitude of the response and provide a signal proportional to the unsteady pressure. According still further to the present invention, the displacement based sensor may measure the acceleration, velocity or displacement of the surface of the pipe in response to the unsteady pressure. According still further to the present invention, a signal processor provides a signal indicative of the unsteady pressure.

The present invention provides a significant improvement over the prior art by providing a non-intrusive pressure sensor for the measurement of unsteady (ac or dynamic) pressure in a fluid within a pipe using displacement based sensors. Thus, the present invention enables real time pressure measurement for oil and gas exploration and production or for other applications where a fluid (liquid or gas) is flowing in a pipe or conduit.

The foregoing and other objects, features and advantages of the present invention will become more apparent in light of the following detailed description of exemplary embodiments thereof.

DETAILED DESCRIPTION OF PREFERRED EMBODIMENTS

Figure 1:
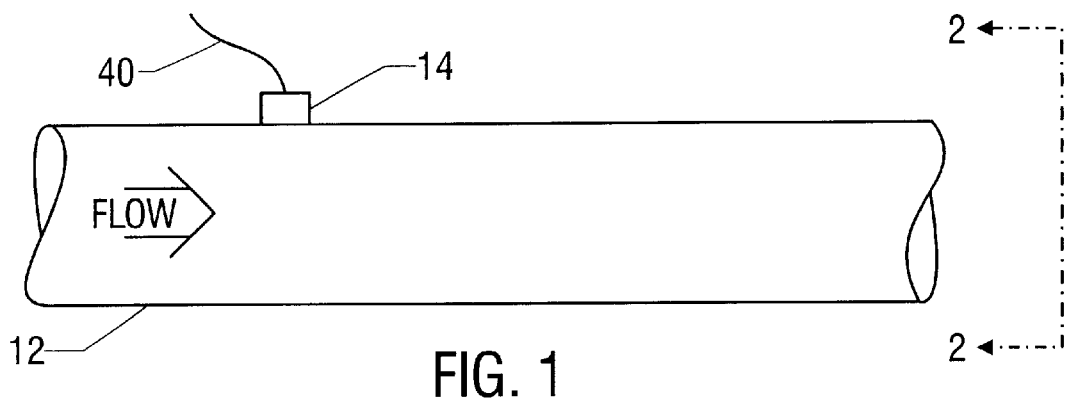
FIG. 1 is a side view of a displacement based pressure sensor disposed on a pipe, in accordance with the present invention.

Referring to FIG. 1, a pipe (or conduit) 12 is provided with non-intrusive displacement based pressure sensors 14 disposed on pipe 12. Displacement based pressure sensor 14 may comprise an accelerometer, a velocity measuring device or a direct displacement measuring device capable of sensing unsteady pressures within a moving fluid in pipe 12 as will be more fully described hereinafter.

Figure 2:
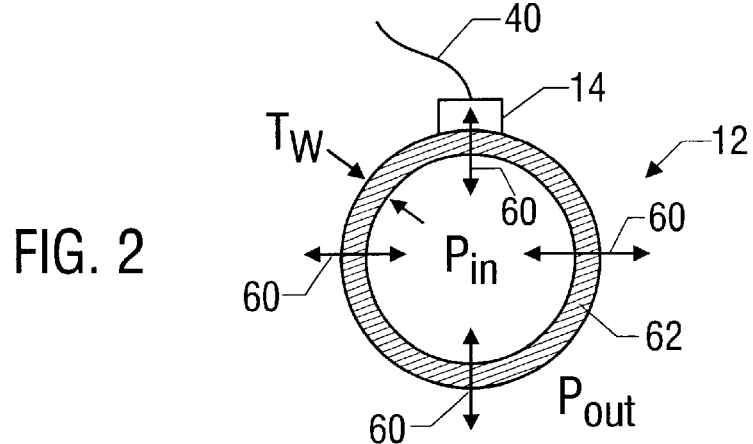
FIG. 2 is a cross-sectional end view of a pipe and a pressure sensor showing inside pressure $P_{in}$ and outside pressure $P_{out}$, in accordance with the present invention.

Referring to FIG. 2, the pressure sensor 14 measures the physical response of wall 62 in the radial direction represented by arrows 60. The pipe wall displaces radially due to elastic expansion and contraction of the diameter of the pipe 12 in response to internal pressure $P_{in}$ changes, as indicated by the arrows 60. The magnitude of displacement in the radial direction 60 is determined by the hoop strength of the pipe 12, the internal pressure $P_{in}$, the external pressure $P_{out}$ outside the pipe 12, the thickness $T_w$ of the pipe wall 62, and the rigidity or modulus of the pipe material. As the internal pressure $P_{in}$ changes, the pipe responds in the radial direction, which causes the pressure sensor 14 to output a signal proportional to the response and the magnitude of the pressure change.

Displacement based sensor 14 may comprises a uni-axial type sensor or a multi-axis type sensor. In order to optimize the sensitivity of the sensor, one of the measurement axes of the sensor should be closely aligned with the radial response of the pipe 12 in the direction indicated by arrows 60.

Referring to FIG. 2 and FIG. 1, in an embodiment that employs an accelerometer 14 as a pressure sensor, the pressure sensor may measure the unsteady (or dynamic or ac) pressure variations $P_{in}$ inside the pipe 12 by measuring the acceleration of the surface of pipe 12 in a radial direction, as represented by arrows 60. The acceleration of the surface of pipe 12 is measured at the location of the accelerometer 14 as the internal pressure $P_{in}$ changes, and thus measures the local elastic dynamic response of the wall 62 of the pipe. Sensor 14 outputs a signal on line 40 which is proportional to the magnitude of the ac pressure sensed within pipe 12 as will be discussed more fully herein below. The magnitude of the acceleration response of pipe wall 62 is variously dependent upon the hoop strength of the pipe 12, the internal pressure $P_{in}$, the external pressure $P_{out}$ outside the pipe 12, the thickness $T_w$ of the pipe wall 62, and the rigidity or modulus of the pipe material. Thus, the thickness of the pipe wall 62 and the pipe material in the sensor location may be set based on the desired sensitivity of the sensor and other factors and may be different from the wall thickness or material of the pipe 12 outside the sensor mounting region.

Figure 3:
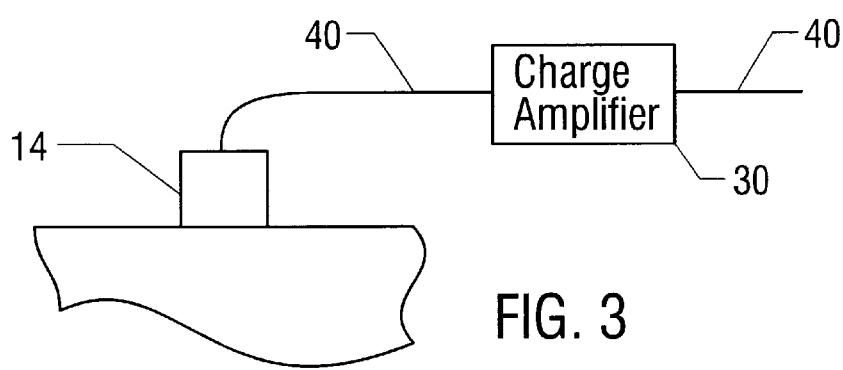
FIG. 3 is a side view of a displacement based pressure sensor disposed on a pipe showing a charge amplifier, in accordance with the present invention.

Accelerometer 14 may comprise any known form of accelerometer including a bonded or an unbonded strain gage accelerometer, a semiconductor strain gage accelerometer, a liquid damped differential-transformer accelerometer, a piezoelectric accelerometer, a geophone, etc. In addition, accelerometer 14 may be of the deflection type or null-balance type. With reference to FIG. 3, accelerometer 14 may comprise a high impedance device, requiring an external charge amplifier 30 within line 40 or may comprise a low impedance device that does not require further amplification.

Figure 4:
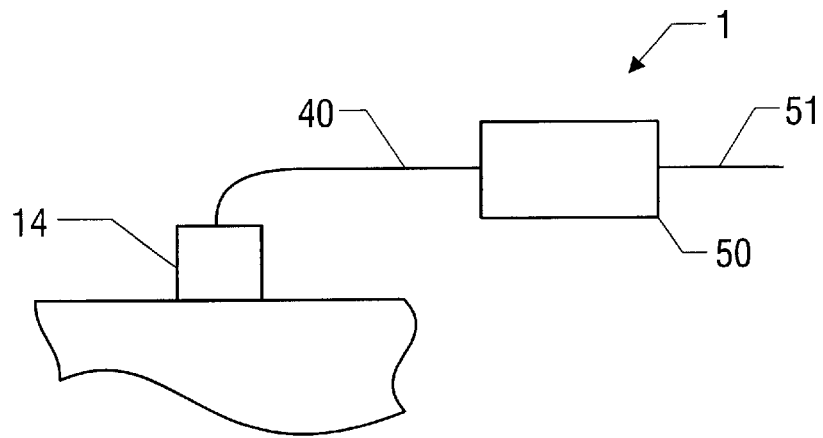
FIG. 4 is a side view of a displacement based pressure sensor disposed on a pipe showing a signal processor, in accordance with the present invention.

Referring to FIG. 4, a pressure sensing system 1 is shown including pressure sensor 14, line 40 and signal processor 50 to convert the output signal of the sensor as described hereinabove. In an embodiment which utilizes an accelerometer as pressure sensor 14, an output signal is generated on line 40 that is directly proportional to the unsteady pressure within pipe 12. Signal processor 50 receives the signal from line 40 and converts the signal to any suitably usable form and provides an output pressure signal on line 51. Also, some or all of the functions within the signal processor 50 may be implemented in software (using a microprocessor or computer) and/or firmware, or may be implemented using analog and/or digital hardware, having sufficient memory, interfaces, and capacity to perform the functions described herein. For instance, signal processor 50 may provide output on line 51 indicative of the pressure, acceleration, velocity, or displacement of pipe wall 62 in response to unsteady pressure within pipe 12. Velocity or displacement information may be obtained through known integration techniques performed on the acceleration information provided by accelerometer 14.

In another embodiment of the present invention, pressure sensor 14 may comprise an absolute displacement pickup which measures the vibratory displacement of pipe wall 62 directly in response to unsteady pressure within the pipe 12. Similar to that described herein above with respect to accelerometers, the displacement sensor 14 outputs a signal on line 40 that is directly proportional to the unsteady pressure within pipe 12. Signal processor 50 receives the signal from line 40 and converts the signal to any suitably usable form and provides an output pressure signal on line 51. For instance, signal processor 50 may provide output on line 51 indicative of the pressure, acceleration, velocity, or displacement of pipe wall 62 in response to unsteady pressure within pipe 12. In this particular embodiment, the displacement having been measured directly, acceleration or velocity information may be obtained through known differential techniques.

In yet another embodiment the present invention, pressure sensor 14 may comprise an absolute velocity pickup which measures the velocity of the displacement of pipe wall 62 directly in response to unsteady pressure within the pipe 12. Similar to that described herein above with respect to accelerometers, the displacement sensor 14 outputs a signal on line 40 that is directly proportional to the unsteady pressure within pipe 12. Signal processor 50 receives the signal from line 40 and converts the signal to any suitably usable form and provides an output pressure signal on line 51. For instance, signal processor 50 may provide output on line 51 indicative of the pressure, acceleration, velocity, or displacement of pipe wall 62 in response to unsteady pressure within pipe 12. In this particular embodiment, the velocity having been measured directly, acceleration or information may be obtained through known differential techniques and displacement information may be obtained through known integration techniques performed.

Figure 5:
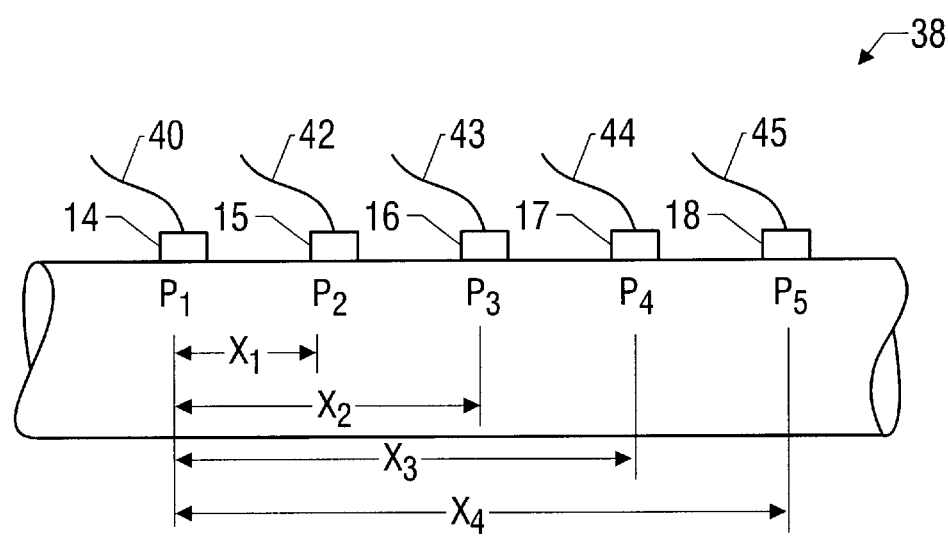
FIG. 5 is a side view of a pipe with a plurality of displacement based pressure sensors disposed at different axial positions along the pipe, in accordance with the present invention.

Referring to FIG. 5, the present invention further includes a plurality of displacement based pressure sensors 14–18 disposed on pipe 12 as shown. The array 38 of sensors 14–18 measure the local unsteady pressures at various axial positions along pipe 12 and output signals proportional to the pressures $P_1$–$P_5$ on lines 40–45, respectively. The relative distances $X_1$–$X_4$ may or may not be uniform depending on the output desired from the array 38. The sensors 14–18 may comprise any of the displacement based pressure sensors described herein including various types in a single array 38.

Figure 6:
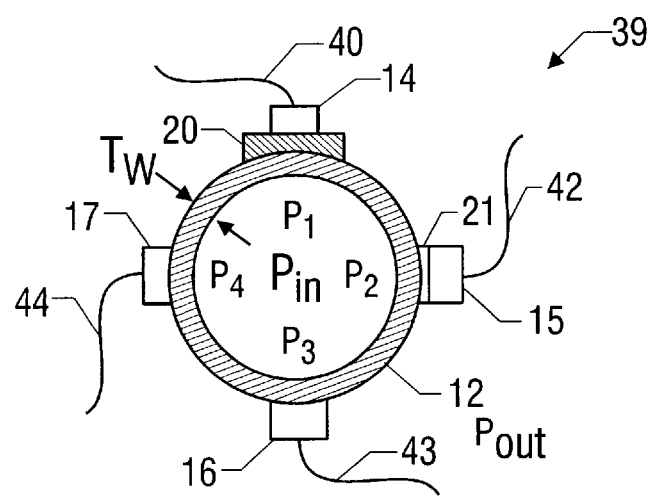
FIG. 6 is an end view of a pipe with a plurality of displacement based pressure sensors disposed around the circumference of the pipe, in accordance with the present invention.

Referring to FIG. 6, alternatively, the present invention may comprise a circumferential array 39 of sensors 14–17 disposed about the circumference of pipe 12. The array 39 of sensors 14–17 measures the local unsteady pressures at various circumferential positions around pipe 12 and outputs signals proportional to the pressures $P_1$–$P_4$ on lines 40–44, respectively. The angular relationships between sensors 14–17 may or may not be uniform depending on the output desired from the array 38. The sensors 14–17 may comprise any of the displacement based pressure sensors described herein including various types in a single array 39. In addition, the sensors may be both axially and circumferentially distributed along pipe 12.

For any of the embodiments described herein, the pressure sensors may be removably or permanently attached to the pipe by adhesive, glue, epoxy, tape, magnets, wax, or other suitable attachment means and their equivalents to ensure suitable contact between the sensor and the pipe 12. The sensors may alternatively be removable or permanently attached via known mechanical techniques such as by mechanical fasteners, by a spring loaded arrangement, by clamping, by a clamshell arrangement, by strapping, or by other equivalents. To optimize performance of the present invention, the displacement based pressure sensor should be mounted rigidly over the frequency range of interest. Referring to FIG. 6, sensor 14 is mounted to pipe 12 via mounting pad 20. Mounting pad 20 may comprise any shape that conforms to pipe 12 (or other shaped conduit) and that ensures suitable displacement sensing contact between sensor 14 and the pipe 12 within the range of frequencies desired. In embodiments where the pipe is ferromagnetic, the sensors may be simply disposed on the surface of the pipe by a magnet 21 as shown with respect to sensor 15.

The present invention may be used to measure any parameter (or characteristic) of the contents of the pipe which is related to pressure. For example, the present invention may be used to measure when a slug of liquid or solid passes through the pipe by the sensor due to the pressure wave which is created.

Also, instead of a pipe, any conduit for carrying a fluid (where a fluid is defined as a liquid or a gas) may be used if desired. Further, it should be understood that the present invention may be used in optical reflection and/or transmission modes. Also, even though the invention has been illustrated using three pressure sensors, it should be understood that more or less sensors may be used, depending on the application.

It should be understood that any of the features, characteristics, alternatives, or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. A system for measuring a naturally occurring unsteady pressure of a fluid flowing within a pipe, comprising:

a pipe displaced only by the naturally occurring unsteady pressure of the fluid flowing within the pipe; and a displacement sensor disposed on a surface of the pipe for measuring a displacement response of the pipe to the naturally occurring unsteady pressure of the fluid flowing within the pipe and for providing a signal proportional to the naturally occurring unsteady pressure.

2. The system of claim 1, wherein the displacement sensor comprises an accelerometer and wherein the displacement response is a radial acceleration of the pipe surface.

3. The system of claim 1, wherein the displacement sensor comprises an absolute velocity sensor and wherein the displacement response is a radial velocity of the pipe surface.

4. The system of claim 1, wherein the displacement sensor comprises an absolute displacement sensor and wherein the displacement response is a radial displacement of the pipe surface.

5. The system of claim 1, wherein the sensor is disposed on an outside surface of the pipe.

6. The system of claim 1, further comprising a mounting pad disposed on the surface of the pipe, the mounting pad conforming to a circumference of the pipe and wherein the sensor is disposed on the mounting pad.

7. The system of claim 1, further comprising a signal processor for receiving the signal proportional to the naturally occurring unsteady pressure and providing a signal indicative of the naturally occurring unsteady pressure.

8. A system for measuring a naturally occurring unsteady pressure of a fluid flowing within a pipe, comprising:

a pipe displaced only by the naturally occurring unsteady pressure of the fluid flowing within the pipe; and a plurality of displacement sensors disposed on a surface of the pipe, each sensor measuring a displacement response of the pipe to the naturally occurring unsteady pressure of the fluid flowing within the pipe and for providing a signal proportional to the naturally occurring unsteady pressure.

9. The system of claim 8, wherein the displacement sensors are each disposed at a different axial position along the pipe and measure the displacement response at each axial position.

10. The system of claim 8, wherein the displacement sensors are each disposed at a different circumferential position along the pipe and measure the displacement response at each circumferential position.

11. The system of claim 8, wherein the displacement sensors comprise any combination of accelerometers, absolute velocity sensors, or absolute displacement sensors.

12. The system of claim 8, wherein the sensors are disposed on an outside surface of the pipe.

13. The system of claim 8, further comprising a mounting pad disposed on the surface of the pipe, the mounting pad conforming to a circumference of the pipe and wherein the sensors are disposed on the mounting pad.

14. The system of claim 8, further comprising a signal processor for receiving the signal proportional to the naturally occurring unsteady pressure and providing a signal indicative of the naturally occurring unsteady pressure.

15. A method for measuring the naturally occurring unsteady pressure of a fluid flowing within a pipe, comprising:

displacing the pipe using only the naturally occurring unsteady pressure of the fluid flowing within the pipe;

measuring a displacement response of a surface of the pipe in response to the naturally occurring unsteady pressure with a displacement sensor; and providing a signal proportional to the naturally occurring unsteady pressure.

16. The method of claim 15, further comprising measuring a displacement response of an outside surface of the pipe in response to the naturally occurring unsteady pressure.

17. The method of claim 15, further comprising measuring a displacement response of a surface of the pipe in response to the naturally occurring unsteady pressure inside of the pipe.

18. The method of claim 15, wherein the method further comprises:

calculating a value of the naturally occurring unsteady pressure from the proportional signal; and providing a signal indicative of the naturally occurring unsteady pressure.

\* \* \* \* \*